UNITED STATES PATENT OFFICE 2,558,177

VINYL CHLORIDE RESIN PLASTICIZED WITH CHLORINATED HYDROCARBONS

André Gislon, Paris, and Joseph Quiquerez, Saint-Cloud, France, assignors to Compagnie Francaise de Raffinage (Societe Anonyme), Paris, France No Drawing. Application May 27, 1946, Serial No. 672,705. In France May 31, 1945

10 Claims. (Cl. 260—33.8)

In the patent application Serial No. 637,488, we have described a method for plasticizing consisting in using, as plasticizers, products having the general formula:

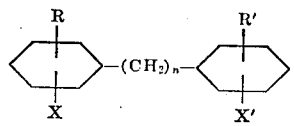

R and R' being selected from the group consisting of aliphatic substituents and hydrogen and X and X' being chlorine substituents, the number and position of all said substituents being unrestricted while $n$ is an integer less than 5.

Now, we have found that it is of interest to insert further complementary nuclei in the chain so as to obtain substances having the following formula:

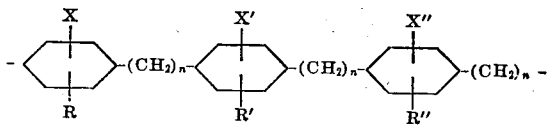

In this formula R, X, and $n$ are defined as indicated above. That is to say, R, R' and R'' are selected from the group consisting of aliphatic substituents and hydrogen; X, X' and X'' are chlorine substituents, and $n$ is a positive integer less than 5. One of the simplest compounds falling within the scope of the above general formula is the trichlorinated phenylethyldibenzyl

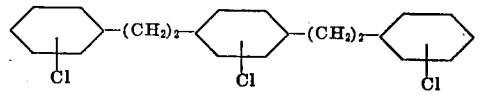

These substances offer inter alia the advantage of showing properties different from those of the two-nuclei substances and in particular that of providing a superior mechanical resistance, which leads to their being preferable in certain cases. In our co-pending application, Serial No. 637,488, we disclose how to produce three and four nuclei compounds within the scope of the present invention.

On the other hand, we have also found that as concerns both the substances having two nuclei and those containing a larger number of nuclei, the mixture of these substances with tricresylphosphate or homologous plasticizing substances shows the unexpected advantage of giving the plasticized products mechanical properties which are higher than those of the above two classes of plasticizers when considered alone.

The following tables relate to tests executed with mixtures containing 40% of plasticizing material and 60% of plasticized material which is, in the case considered, polyvinyl chloride.

The samples have been plasticized in the following manner:

|  | Per cent |
|---|---|
| Sample No. 1: tricresylphosphate alone | 40 |
| Sample No. 2: dichloride of dibenzyl alone | 40 |
| Sample No. 3: trichlorinated phenylethyldibenzyl | 40 |
| Sample No. 4: mixture of 20% of tricresylphosphate with 20% of dichlorobenzyl | |
| Sample No. 5: 20% of tricresylphosphate with 20% of trichlorinated phenylethyldibenzyl | |

Table

| Sample No. | | Resistance per sq. mm.² R | Elongation, Per Cent A | Product A×R |
|---|---|---|---|---|
| 1 | 40% tricresylphosphate | 1.13 | 200 | 226 |
| 2 | 40% dichlorodibenzyl | 1.31 | 240 | 314 |
| 3 | 40% trichlorinated phenylethyldibenzyl. | 1.83 | 125 | 230 |
| 4 | 20% tricresylphosphate plus 20% dichlorodibenzyl | 1.34 | 215 | 288 |
| 5 | 20% tricresylphosphate plus 20% trichlorinated phenylethyldibenzyl | 2.47 | 218 | 540 |

What we claim is:

1. A plasticizer adapted to be used in plasticizing a vinyl chloride polymer, said plasticizer having the general formula:

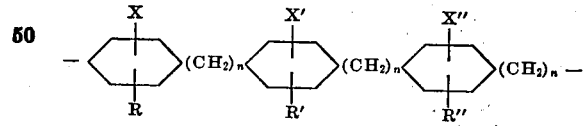

wherein R, R', and R'' are selected from the group consisting of aliphatic substituents and hydrogen; X, X', and X" are chlorine substituents; the number of benzene nuclei is three; and $n$ is a positive integer less than five.

2. A plasticizer adapted to be used in plasticizing a vinyl chloride polymer, said plasticizer being a linear ring-chlorinated aralkyl diarylalkane having at least one chlorine substituent on each benzene ring.

3. A plasticizer adapted to be used in plasticizing a vinyl chloride polymer, said plasticizer being ring-chlorinated trichloro phenylethyl dibenzyl having at least one chlorine substituent on each benzene ring.

4. A plasticized resin comprising a vinyl chloride polymer and a ring-chlorinated aralkyl diarylalkane as a plasticizer, said aralkyl diarylalkane having at least one chlorine substituent on each benzene ring.

5. A plasticized resin comprising polyvinyl chloride and ring-chlorinated trichloro phenylethyl dibenzyl as a plasticizer, said phenylethyl dibenzyl having at least one chlorine substituent on each benzene ring.

6. A plasticizer comprising a mixture of tricresylphosphate and ring-chlorinated trichloro phenylethyl dibenzyl having at least one chlorine substituent on each benzene ring.

7. A plasticized resin comprising about 60% polyvinyl chloride, 20% tricresylphosphate, and 20% ring-chlorinated trichloro phenylethyl dibenzyl, said phenylethyl dibenzyl having at least one chlorine substituent on each benzene ring.

8. A plasticizer adapted to be used in plasticizing a vinyl chloride polymer, said plasticizer comprising a mixture of tricresylphosphate and a chlorinated polyarylalkane which has the general formula:

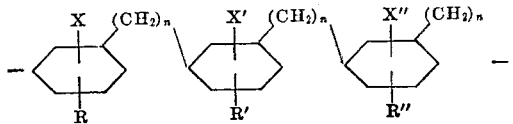

wherein R, R', and R" are selected from the group consisting of aliphatic substituents and hydrogen; X, X', and X" are chlorine substituents; the number of benzene nuclei is three; and $n$ is a positive integer less than five, at least one chlorine atom being substituted on each benzene ring.

9. A plasticized resin comprising a polymer derived from vinyl chloride and ring-chlorinated trichloro phenylethyl dibenzyl as a plasticizer, said phenylethyl dibenzyl having at least one chlorine substituent on each benzene ring.

10. A plasticized resin comprising a polymer derived from vinyl chloride and a plasticizer having the general formula:

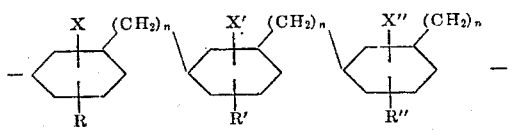

wherein R, R', and R" are selected from the group consisting of aliphatic substituents and hydrogen; X, X', and X" are chlorine substituents; the number of benzene nuclei is three; and $n$ is a positive integer less than five.

ANDRÉ GISLON.
JOSEPH QUIQUEREZ.

REFERENCES CITED

The following references are of record in the file of this patent:

UNITED STATES PATENTS

| Number | Name | Date |
|---|---|---|
| 2,012,302 | Clark et al. | Aug. 27, 1935 |
| 2,285,562 | Britton | June 9, 1942 |
| 2,460,376 | Caprio et al. | Feb. 1, 1949 |